United States Patent
Olivier et al.

(10) Patent No.: US 10,408,127 B2
(45) Date of Patent: Sep. 10, 2019

(54) TURBOMACHINE PROVIDED WITH AN ASSEMBLY FOR CONTROLLING THE PITCH VARIATION OF A PROPELLER

(71) Applicant: SNECMA, Paris (FR)

(72) Inventors: Belmonte Olivier, Moissy-Cramayel (FR); Didier Rene Andre Escure, Moissy-Cramayel (FR); Jeremy Phoria Lao, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 713 days.

(21) Appl. No.: 14/911,431

(22) PCT Filed: Aug. 5, 2014

(86) PCT No.: PCT/FR2014/052039
§ 371 (c)(1),
(2) Date: Feb. 10, 2016

(87) PCT Pub. No.: WO2015/022464
PCT Pub. Date: Feb. 19, 2015

(65) Prior Publication Data
US 2016/0195012 A1 Jul. 7, 2016

(30) Foreign Application Priority Data
Aug. 12, 2013 (FR) ..................... 13 57959

(51) Int. Cl.
*F02C 3/107* (2006.01)
*B64C 11/38* (2006.01)
(Continued)

(52) U.S. Cl.
CPC .............. *F02C 3/107* (2013.01); *B64C 11/38* (2013.01); *F02K 3/06* (2013.01); *B64D 2027/005* (2013.01); *Y02T 50/66* (2013.01)

(58) Field of Classification Search
CPC . F02C 3/107; F02K 3/06; B64C 11/30; B64C 11/305; B64C 11/306; B64C 11/38;
(Continued)

(56) References Cited

U.S. PATENT DOCUMENTS

2014/0017086 A1  1/2014  Charier et al.

FOREIGN PATENT DOCUMENTS

| EP | 2384967 | 11/2011 |
|---|---|---|
| GB | 2254893 | 10/1992 |

(Continued)

OTHER PUBLICATIONS

International Search Report and Written Opinion, dated Oct. 30, 2014, Application No. PCT/FR2014/052039.

*Primary Examiner* — Jason D Shanske
*Assistant Examiner* — Danielle M Christensen
(74) *Attorney, Agent, or Firm* — Womble Bond Dickinson (US) LLP

(57) ABSTRACT

The assembly (25) links a static housing (24) of the turbomachine, into which supply lines, in particular fluid supply lines (23), arrive, to the blades of the propeller, and comprises: —a system for controlling fluid pitch (27), rigidly connected to the static housing (24), capable of being linked to the supply lines, —a linear actuator (28) having two chambers separated by a piston (71) of which the sliding is dictated by the control system and allows the blades to rotate, and —two concentric tubes (36, 37) housed in the planetary shaft of the epicyclic reduction gear and linking the system (27) to the actuator (28) by delimiting two fluid passages (45, 48) linked, respectively, with the two chambers (72, 73) of the actuator.

10 Claims, 4 Drawing Sheets

(51) Int. Cl.
*F02K 3/06* (2006.01)
*B64D 27/00* (2006.01)

(58) Field of Classification Search
CPC ....... B64C 11/40; B64C 11/42; F04D 29/323; F04D 29/34
See application file for complete search history.

(56) References Cited

FOREIGN PATENT DOCUMENTS

| WO | WO-9822340 | 5/1998 |
|---|---|---|
| WO | WO-2012131271 | 10/2012 |

TURBOMACHINE PROVIDED WITH AN ASSEMBLY FOR CONTROLLING THE PITCH VARIATION OF A PROPELLER

The present invention relates to an assembly for controlling the pitch variation of a turbine engine propeller and more particularly, though not exclusively, the application of such an assembly to a turbine engine with a pair of upstream and downstream contra-rotating pusher propellers, the pitch variation of the downstream propeller being controlled by said assembly.

The relevant turbine engines with pusher propellers are turboshaft engines of the so-called "open rotor" or "unducted fan" type, and these turboshaft engines are the subject of numerous developments in particular due to their lesser fuel consumption by comparison with the multi-flow turbojet engines in use on aeroplanes. The architecture of open rotor turboshaft engines differs from that of turbojet engines in that the blower is no longer internal but external, and that it is composed of two coaxial and contra-rotating propellers which can be situated upstream or downstream of the gas generator.

The invention can likewise apply to a turboprop engine comprising a turbine engine and a propeller, said turbine engine being suitable for driving said propeller in rotation by a reduction gear. A turboprop engine likewise includes a control system for the pitch of said propeller, making it possible to control the movement of setting the blades of the propeller.

A turboshaft engine 1 with a pair of contra-rotating propellers upstream 2 and downstream 3 is represented schematically with regard to FIG. 1 and principally includes two distinct parts along a central longitudinal axis A. A "gas generator" part G is situated inside a fixed cylindrical nacelle 4 having a structural casing 5, supported by the structure of the aircraft (such as the rear part of the fuselage of an aeroplane), and a "propulsion" part P with the pair of contra-rotating propellers 2, 3 constituting the unducted fan (open rotor). In this example of a turboshaft engine, this part P lengthens the gas generator G and the nacelle 4.

The gas generator part G of the turboshaft engine 1 usually includes, from upstream to downstream in the flow direction, with respect to the axis A, of the gaseous flow F entering the nacelle 4 of the turboshaft engine, one or two compressors 7 according to the architecture of the gas generator with a single or double body, an annular combustion chamber 8, one or more turbines 9 at a distinct pressure according to said architecture, one of said turbines driving, by means of a differential reduction gear or epicyclic gear train housing 10 (designated as PGB for "power gear box") and in a contra-rotating manner, the concentric and coaxial shafts 11 and 12 of the two propellers, upstream 2 and downstream 3, aligned along the axis A of the turboshaft engine. The shaft 12 of the downstream propeller, secured to the crown of the reduction gear, is internal with respect to the shaft, then external 11 with respect to the upstream propeller, secured to the planet carrier of said reduction gear. A nozzle 13 terminates the turboshaft engine 1 in a conventional manner.

With regard to the propulsion part P, the two contra-rotating propellers (or rotors), respectively upstream (front) 2 and downstream (rear) 3, are disposed on radial parallel planes, perpendicular to the axis A, and comprise rotatable casings with polygonal rings 14, 15 which extend the nacelle and in which radial cylindrical recesses 16, 17 are arranged which are regularly distributed in order to receive feet or pivots 18, 19 of the blades 20, 21 of the propellers.

The casings with rings 14, 15 are respectively connected to the drive shafts 11, 12 rotating in reverse directions of rotation by means of the turbine and the reduction gear 10, the latter in particular imposing the reverse direction of rotation on the two propellers.

Functionally and briefly, the air flow F entering the turboshaft engine 1 is compressed, then mixed with fuel and burnt in the combustion chamber 8. The combustion gases which are produced then pass into the part with turbines 9 in order to drive in inverse rotation, via the epicyclic reduction gear 10, the propellers 2, 3 which supply most of the thrust. The combustion gases are expelled through the nozzle 13, thus increasing the thrust of the turboshaft engine 1.

Moreover, in order to enable the optimal operation of the turboshaft engine 1 according to the different flight phases encountered, an appropriate fluid control assembly 25 makes it possible to vary the setting of the blades during flight, that is to say the pitch of each contra-rotating propeller. For this purpose, the pivots 18, 19 of the radial blades are driven in rotation by their respective assemblies 25 in order to turn, with respect to their axes B substantially perpendicular to the longitudinal axis A, in the radial recesses 16, 17. For example, depending upon the assembly, the blades can turn by +90° to 30° for the flight phases, by +30° to −30° for the phases on the ground and in reverse (reverse thrust), and can have a rapid return to 90°, in the feathered position, in the event of malfunction in flight (engine failure), for which the blades are flush with respect to the direction of advance of the aeroplane and offer the least possible drag. The angular orientation between the feathered and reverse end positions is approximately 120°.

Only the control assembly 25 of the blades of the downstream propeller 3 is shown schematically on FIG. 1 and in greater detail on FIG. 2.

Starting from a static exhaust casing 24 of the turboshaft engine 1, into which there enter radially lines or pipes for services 23, such as fluid (in this application, hydraulic) and electrical supply lines intended in particular for operation of the assembly 25 according to the prior art, this assembly usually comprises, from upstream to downstream, a cylindrical sleeve 26, used for channeling the supply lines 23, then a system for controlling fluid pitch 27 defining the operational limits of the geometry of the propeller blades, then a linear actuator 28 transmitting the axial movement imposed by the system 27 by concentric tubes 36, 37 of which the internal passages connect the chambers of the system, according to the phases chosen, to the chambers of the actuator which are delimited by a piston.

The actuator is likewise associated with a connection mechanism 29 connecting the movable part of the actuator to the pivots 19 of the blades 21, thus transforming the sliding of the piston of the actuator (dictated by the system via the tubes) into a rotation of the downstream propeller blades around the axes. The actuator 28 is situated substantially vertically in line with the hub of the downstream propeller 3 in order to facilitate the transmission of movement of its sliding movable part to the rotating pivots of the downstream propeller blades.

In the following description, the fluid pitch control system 27 will be designated as the FFS (flight fine stop acronym) system for the above-mentioned three phases of operation of the assembly.

As can be seen on FIGS. 1 and 2, the cylindrical sleeve 26 is connected mechanically, upstream, to the static casing 24 of the gas generator G and, downstream, to the FFS pitch control system 27 leading to the actuator 28. For this purpose, the sleeve is accommodated, along the axis A, in the internal shaft 12, likewise passing through the interior of the epicyclic reduction gear 10. For the operation of the FFS system 27 according to the above-mentioned specific phases, among the lines 23, three lubricant (oil) supply lines 23' run through the interior of the sleeve 26. These lines 23' are supplied from a fluid source of lubricant (not shown), situated in the structural casing 5, on the nacelle side, and pass through radial arms in order to terminate in the gas generator part G.

In addition to these lines 23' of the FFS control system 27, the sleeve 26 contains lubrication lines 23" for different bearings, such as the inter-shaft bearing 30 shown in part on FIG. 2, and the bearing 31 situated between the sleeve 26 and the internal shaft 12 of the downstream propeller, as well as lines for electrical services 23''' intended for the sensors of the actuator 28 and for other items of electrical equipment downstream.

The drawings show the multitude of hydraulic and electrical lines which pass through the interior of this sleeve 26 in order to supply in particular the FFS system 27 for variation with limits for operation of the jack 28, as well as the lubrication of the relevant bearings with oil.

This involves a sleeve 26 with a corresponding overall diameter size in order to route all the lines there, particularly since the diameter of the supply lines 23' of the FFS system 27 is substantial due to the flow rates and pressures which are necessary, as shown by the cross-section CP on FIG. 2. This sleeve 26 in turn dictates a minimum diameter for the definition of the planetary shaft 10' (which co-operates with the shaft 32 of the power turbine in order to drive the reduction gear 10 in rotation) of the differential epicyclic reduction gear 10, since this sleeve 26 passes into the interior of the planetary shaft 10'. Thus, the integration of the reduction gear 10 itself poses problems due to the considerable space occupied by the sleeve 26 at the centre of the turboshaft engine 1.

Therefore attempts have been made to design a propeller pitch control assembly of which the supply lines and the sleeve 26 have a restricted overall size. In particular, attempts have been made to reduce the passage diameter necessary in order for these elements to pass into the interior of the planetary shaft 10' of the epicyclic reduction gear 10.

A drawback resulting from the substantial overall size of the planetary shaft 10' and the design of the open rotors, which derives from the diameter required by the supply lines and the sleeve 26, is that it can be difficult, or even impossible, to comply with the reduction ratio of the reduction gear 10 in the space allocated, given that the external diameter of the reduction gear 10 is limited by the flow path of the gaseous flow passing around the reduction gear 10.

Finally, this architecture (sleeve 26, FFS system 27 and actuator 28) of the fluid control assembly 25 also creates another problem in terms of the connections of the hydraulic supply lines and the electrical harnesses which take place system blind, the connections of the FFS system of the assembly engaging in connections of the lines and harnesses situated inside the sleeve 26, and therefore not visible. However, a solution to this problem has been disclosed in the French patent application No. FR 1256923 in the name of the applicant.

An analogous solution has been disclosed in the documents WO 2012/131271-A1 and EP-2384967-A2.

The object of the present invention is to provide a solution to these various problems.

To this end the invention relates to a fluid control assembly for varying the pitch of a propeller of a turbine engine, such as a turbine engine having an epicyclic reduction gear driven by the planetary shaft connected to a power turbine of the turbine engine, said assembly connecting an upstream static casing of the turbine engine, into which fluid and electrical supply lines arrive, to the downstream propeller blades, characterised in that it comprises from upstream to downstream a system for controlling fluid pitch secured to the static casing, defining the operational limits of the geometry of the blades of the downstream propeller and capable of being connected to the supply lines, then a linear actuator having two chambers separated by a piston of which the sliding is dictated by the control system and allows the blades to rotate, said system being connected to the actuator by means of two concentric tubes housed in the planetary shaft of the epicyclic reduction gear and delimiting two fluid passages connected respectively to the two chambers of the actuator.

Thus according to the invention the assembly has a reduced overall size and makes it possible to have a reduction gear of reduced diameter.

Arrangements comprising concentric tubes are known from the documents WO-98/22340 and GB-2254893-A but in the field of conventional propellers, without the problem of the overall size of the reduction gear being taken into consideration at all.

Thus, by means of the new architecture of the assembly, according to the invention the lines are connected directly to the FFS system, so that the overall size of the assembly in the region of the reduction gear can be substantially reduced since it is now devoid of the fluid lines necessary for the FFS system (particularly since these lines have a considerable diameter). The external diameter of the concentric tubes is of course significantly less than the three distinct diameters of the supply lines of the FFS system, passing initially into the sleeve.

Furthermore, the problem associated with the reduction gear and in particular the reduction ratio of this gear no longer arises, as the space gained makes it possible on the one hand to reduce the diameter of the planetary shaft and thus to increase the reduction ratio, and on the other hand to facilitate the integration of the reduction gear.

In a preferred embodiment, the fluid control system is arranged inside the static casing and has a hollow body secured to the casing and inside which are received the two respectively external and internal sliding concentric tubes, and internal chambers which are delimited by the body and the tubes, and are connected respectively to the supply lines in order to control, by the sliding of the tubes and of the piston of the actuator, the orientation of the blades of the propeller, according to the operational phases of the turbine engine.

For example, the hollow body comprises two adjacent chambers which are separated by a partition and through which the external tube passes, the two chambers communicating, via an opening arranged on the external tube, with the annular passage provided between the two tubes and opening into one of the chambers of the actuator, on one side of the piston, and a third chamber connected to the fluid passage of the internal tube and opening into the other chamber of the actuator, on the other side of the piston.

In particular, the two external and internal sliding tubes are guided and retained together by an annular sleeve, at one of their ends, whilst their other ends are connected to the piston of the actuator.

In a preferred embodiment, the assembly is arranged in a sleeve secured to the fixed cylindrical body of the fluid control system at its upstream end, the sleeve is supported over its length by at least one bearing, and the sleeve is likewise accommodated in the planetary shaft of the epicyclic reduction gear. Such a sleeve differs from the prior art in that it does not contain exactly the same supply lines. The word "sleeve" in the following description designates such a sleeve.

The sleeve then serves as an intermediate static shaft between the FFS system and the actuator, protecting the tubes for connection and for fluid supply extending between the system and the actuator.

In addition, since the sleeve has a smaller diameter because it is devoid of the hydraulic lines with large diameters of the FFS system, at least some, or even all, of the lines for lubrication of bearings and/or electrical lines may be arranged along the exterior of the sleeve because of the surrounding space gained by the reduction in diameter of the sleeve. Thus, the connection of the lines to the parts and other equipment is effected visibly and, therefore, securely.

On the outer periphery, the sleeve advantageously has local areas of extra radial thickness for the support of a bearing, between which hydraulic and/or electrical supply lines can pass along the sleeve in the direction of bearings and/or equipment.

According to another feature of the assembly, the actuator is fixed in translation and secured to a rotatable casing of the propeller, and the sliding piston, to which the tubes of the control system are connected, is connected to a mechanism with connecting rods or the like articulated on the pivots of the blades of the propeller to be oriented, mounted on the casing with ring thereof.

Also, in order to enable the change of reference point between the sliding tubes of the control system and the rotatable actuator, bearings are provided on the one hand between the external tube and the piston, and on the other hand between the internal tube and the piston.

According to yet another feature, the static casing has an external casing, and in the latter an aerodynamic casing for the passage of the gaseous flow, and having radial branches for the passage of the supply lines in the direction of the control system, a collector being provided between the aerodynamic casing and the control system in order to combine the supply lines on a cylindrical support and to define with the latter and with upstream and downstream transverse partitions a ventilation chamber with the gaseous flow and, below the support, a recovery chamber for lubricant coming from the control system.

The invention also relates to a turbine engine in particular for an aircraft, of the type comprising a gas generator part and a propulsion part with a pair of upstream and downstream coaxial and contra-rotating propellers, and assemblies for controlling the pitch variation of the upstream and downstream propellers as a function of the operating phases of the turbine engine.

The assembly for controlling the pitch variation of the downstream propeller is advantageously as defined above.

The figures of the accompanying drawings will enable a good understanding of how the invention can be carried out.

In the following description, the invention is explained using an example of a turbine engine with contra-rotating propellers, but the invention may also be applied to a turboprop engine.

Figure 2:
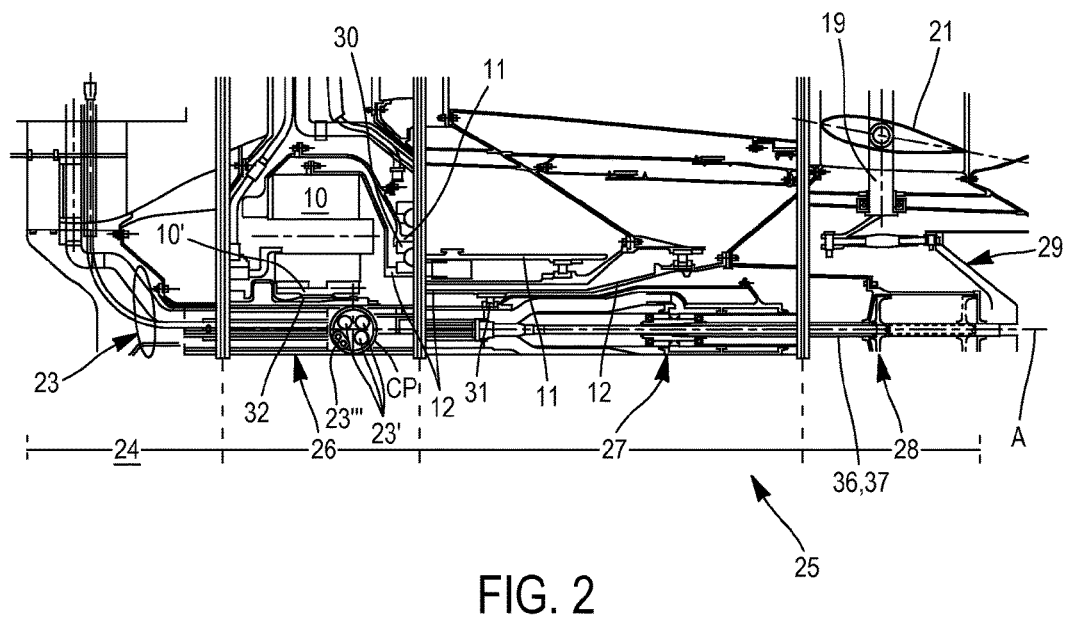
FIG. 2 shows an enlarged axial sectional view of FIG. 1 showing the fluid control assembly according to the prior art with the arrangement of its components, comprising a cross-section CP showing the hydraulic and electrical supply lines passing through the sleeve and a cross-section of a blade 21 showing its profile.
Figure 3:
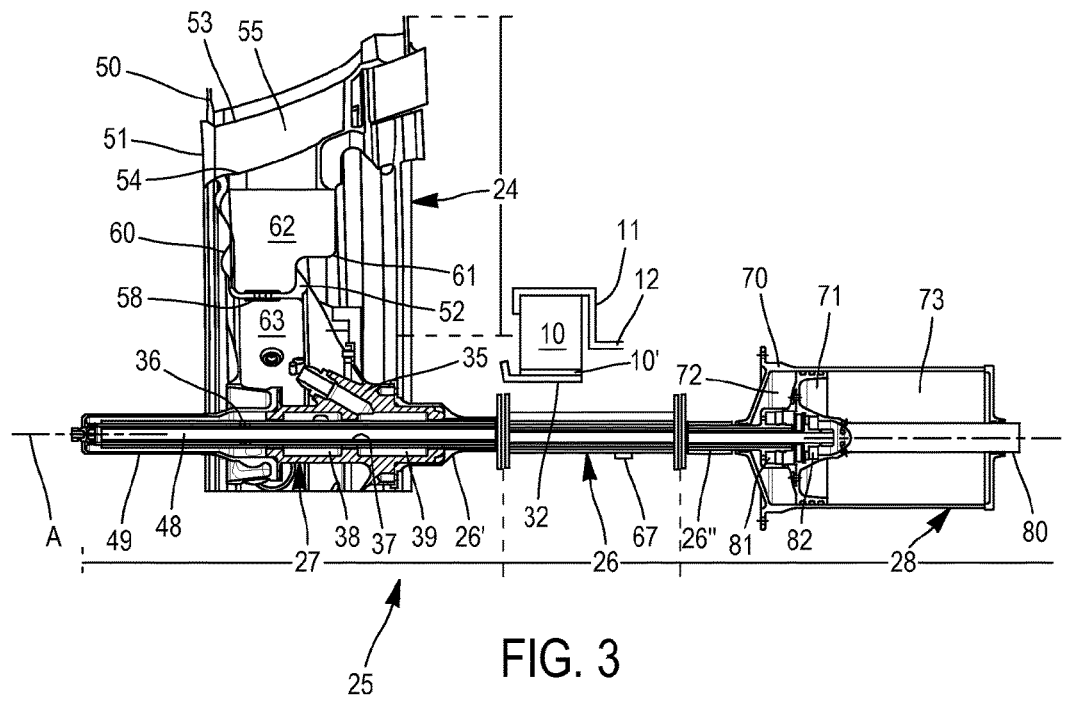
FIG. 3 shows a view in axial cross-section, in accordance with the invention, of the fluid control assembly for the variation of the pitch of the downstream propeller, showing in particular the arrangement of its components.

FIG. 3 shows, according to the invention, the control assembly 25 for modifying the pitch of the blades 21 of the downstream propeller 3 of the turboshaft engine 1, in which the (hydraulic) FFS fluid control system 27, the sleeve 26 and the linear actuator 28, such as a hydraulic jack, are arranged in this order along the axis A, from upstream to downstream of the turboshaft engine 1 with respect to the direction of the gaseous flow, from the static casing 24 from which the service lines 23 for supplying lubricant and electrical power originate, to the jack 28 with which there is associated a connecting rod mechanism 29 (see FIG. 2) which can make the blades turn on their pivots and thus can vary their setting according to the required operating phases.

Figure 4:
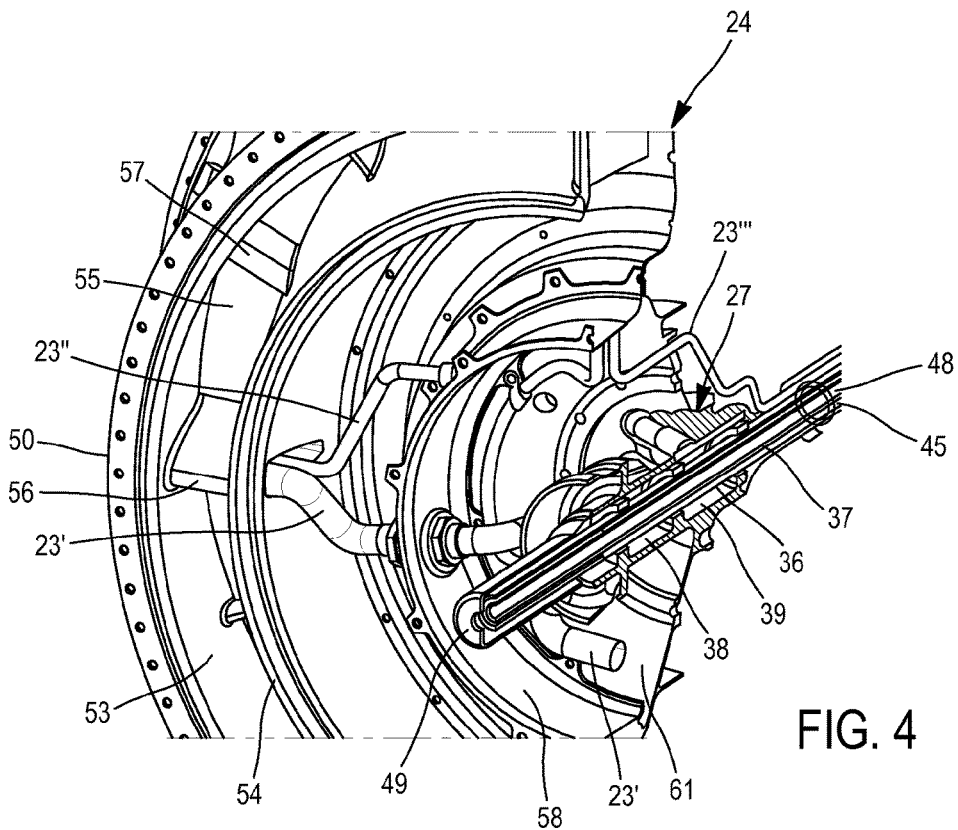
FIG. 4 shows, in partial perspective, a static casing with the supply lines passing through it and leading to the FFS system of the control assembly, situated inside this casing.
Figure 5:
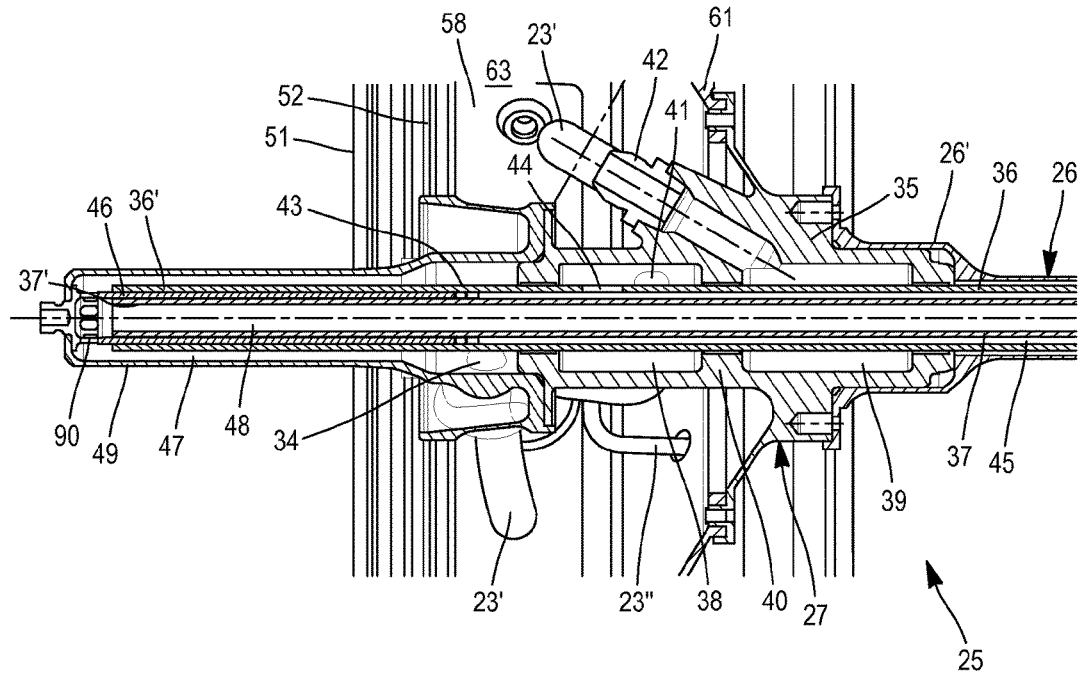
FIG. 5 shows a view in longitudinal section of the static casing and of the FFS system.

The FFS system 27 includes, structurally, a hollow body 35, as shown in FIGS. 3, 4 and 5. This hollow body 35 has a generally cylindrical form with a through passage centred on the axis A. The body 35 is advantageously fixed to the static casing 24. Two sliding concentric tubes, respectively an external tube 36 and an internal tube 37, are provided inside the passage of the body 35. Two adjacent left 38 and right 39 chambers are arranged between the body and the external tube and are separated by a transverse partition 40 corresponding to an internal shoulder of the body, which also contributes to the guiding of the external tube relative to the body. Oil supply lines (or pipes) 23' are connected to the body in order to communicate with the chambers. On FIG. 3-5, the supply line 23' of the left-hand chamber 38 is not visible, and only the opening 41 arranged in the body for access to this chamber is represented. On the other hand, the supply line 23' of the right-hand chamber 39 is shown with the connector 42 fixed to the body.

Moreover, in the wall 43 of the external tube 36 there is arranged an oblong opening 44 which, in the illustrated representation corresponding to the feathered position (FIG. 4), is located in the left-hand chamber 38, and leads to an annular passage 45 provided between the two tubes. This oblong opening 44 has a length greater than the length of the separating partition 40, in order to enable the passage from a quasi-reverse position of the blades to a reverse position of the blades. The change of position is obtained by a series of pressures between the two chambers 38 and 39 which communicate via the oblong opening 44 due to sliding of the tubes.

The two chambers 38, 39 communicate, via an opening 44 arranged in the external tube 36, with the annular fluid passage 45 which is provided between the two tubes 36, 37, and which opens into one of the chambers of the actuator 28, namely the upstream chamber 72, on one side of a piston 71 of the actuator 28.

A third chamber 47 is connected to the fluid passage 48 of the internal tube 37.

A third chamber 47 is provided in the body 35 and connected to the central fluid passage 48 of the internal tube 37 which opens into the other chamber 73 of the actuator, on the other side of the piston 71.

In order to guide the hydraulic fluid into this tube, a cover 49 is fixed on the upstream side of the body and surrounds the upstream ends 36', 37' of the tubes 36, 37, which project from the body. A hydraulic supply line or pipe 23' coming from the casing is connected to the cover by an access opening 34 arranged in said cover. The oil arriving via the line 23' communicates via the opening 34 with an annular space defining the third chamber 47 delimited between the cover 49 and the external tube 36 in order to arrive at the central fluid passage 48 of the internal tube. Moreover, in order to guarantee the coaxiality and the guiding of the tubes relative to one another, a sleeve 46 for relative guiding thereof is provided which is situated in the region of the upstream ends 36', 37' of the tubes surrounded by the cover. The sleeve 46 is connected to the end of the cover 49 and holes 90 are arranged in the part of the sleeve projecting from the ends of the tubes. Thus, the fluid communication between the annular space 47 and the central passage 48 is established.

The downstream ends 36", 37" of tubes are connected to the piston of the jack, as will be seen below.

As illustrated in FIGS. 3 and 4, the static casing 24, through which the different hydraulic and electrical lines 23 pass (the latter in the form of harnesses 23") coming from the structural casing 5, has, radially from the exterior towards the interior, an external casing 50, an aerodynamic casing 51 and a collector 52.

In particular, the external casing 50 defines the geometric line of the external casing and makes it possible to connect the service lines 23 coming from equipment upstream from the turboshaft engine. The aerodynamic casing 51 defines the external cylindrical walls 53 and the internal cylindrical walls 54 of the internal duct 55 of the turbines and includes radial branches 56, 57 connecting the walls to one another. As can be seen on FIG. 4, thick radial branches 56 make it possible to route the different lines 23 through the interior and thin radial branches 57 ensure the aerodynamic function for the orientation of the air stream in the duct 55.

Between this aerodynamic casing 51 and the FFS system 27 is located the annular collector 52 which makes it possible to combine and to retain on an intermediate cylindrical support 58 the service lines 23', 23", 23''' shown on FIG. 4 and coming from the thick radial branches 56. The annular collector 52 leads the service lines 23', 23", 23''' towards the assembly 25, in particular towards the body of the system, while minimising their dimensions. An upstream transverse partition 60 and a downstream transverse partition 61 are secured to the cylindrical support 58. As FIGS. 3 and 5 show, the upstream partition 60 is fixed on its external periphery to the aerodynamic casing 51, whilst its internal periphery is secured to the cover 49 of the FFS system 27, and the downstream partition 61 is fixed at its external periphery to the aerodynamic casing 51 and is rigidly connected at its internal periphery to the body 35 of the FFS system.

Thus, it can be seen that two annular chambers, respectively an external chamber 62 and an internal chamber 63, are arranged between the partitions 60, 61 and the support 58. The external chamber 62, in communication with the duct 55, forms a ventilation chamber for the immediate environment and the internal chamber 63 forms a retrieval chamber for oil which may come from the FFS system 27. Moreover, the downstream partition 61 also makes it possible to define the purge for the cooling of the discs of the turbine, and also to define the boundary between the static casing 24 and the FFS system 27.

It will also be noted that the FFS system 27 is accommodated inside the collector (static casing 24), in such a way that it is thus as close as possible to the lines in order to be connected there in the best way, and that this new arrangement of the assembly 25 gains in terms of axial compactness, as can be seen by comparing FIG. 2, where the casing 25, the sleeve 26, the FFS system 27 and the actuator 28 are aligned one after the other, with FIG. 3, where, from upstream to downstream, the casing and the FFS system 27 are integrated with one another, then followed by the sleeve 26 and the actuator 28.

The three oil supply lines 23' intended for the three chambers 38, 39, 47 of the FFS system 27 are advantageously directly connected to the latter, from the collector 52. Thus these lines, which have a significant diameter (FIG. 4) because of the necessary flow rates and pressures, no longer pass through the sleeve 26.

As the supply lines arrive directly at the body 35 of the FFS system 27, without passing through the sleeve 26, only the tubes 36, 37 delimiting the hydraulic passages for control of the jack pass through the sleeve. These concentric tubes 36, 37, one inside the other, are thus smaller in diameter (diameter equal to the external tube) than the three distinct supply lines 23' (disposed side by side, cross-section CP on FIG. 2) passing through the sleeve according to the prior art. In this way, the sleeve 26 has a significantly smaller diameter. For example, the diameter of the sleeve 26 for an architecture according to the prior art (FIG. 2) goes from a diameter of 100 mm to a diameter of 60 mm with the new architecture of the assembly according to the invention (FIG. 3).

In particular, the sleeve 26 is static and it has an upstream end 26', fixed to the downstream partition or flange 61 of the collector, which surrounds the cylindrical body 35 of the FFS system 27. On the opposite side, the sleeve 26 has a downstream end 26". The sleeve 26 is in the vicinity of the jack 28, without being connected thereto, since, as will be seen below, in the embodiment of the fluid control assembly 25 according to the invention, the linear jack 28 is also rotatable, and secured to the rotor bearing the downstream propeller 3.

Figure 6:
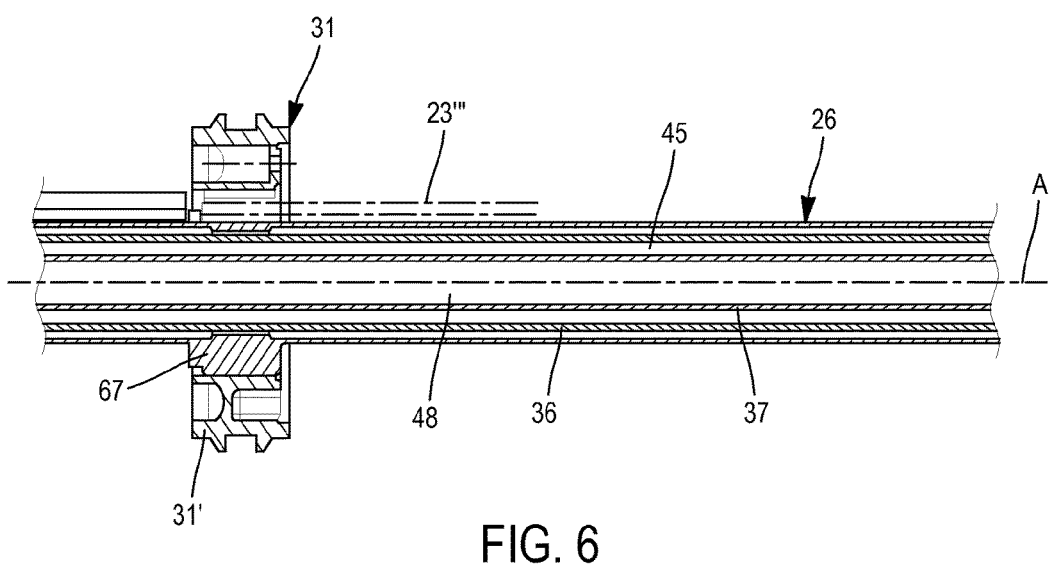
FIG. 6 shows, in longitudinal section, the sleeve according to the invention forming part of the control assembly, arranged between the FFS system and the linear actuator.

Moreover, taking into account the length of this sleeve 26 (greater than a meter) between the static casing 24 and the downstream propeller 3, at least one bearing supports the sleeve on its median part. It can be seen, on FIG. 3 (axially truncated because of this length) and FIG. 6, that local radial extra thicknesses 67 are advantageously distributed regularly over the exterior of the sleeve 26. The bearing 31 is mounted by its internal ring 31' around the extra thicknesses, the external ring (not shown) being in contact with the internal drive shaft 12 of the downstream propeller 3. FIG. 3 also shows schematically the reduction gear 10 co-operating via the planetary shaft 10' with the turbine shaft 32 which surrounds the sleeve 26, and the shafts 11, 12 of the propellers, connected to the reduction gear.

Thus supply lines, for example electrical supply lines 23''' in the form of harnesses (shown by chain-dotted lines on FIG. 6), coming from the static casing 24 and then extending around the exterior of the body 35 of the FFS system 27 and then of the sleeve 26 in order to pass between the extra thicknesses 67 and to supply the downstream electrical equipment (not shown), can pass between the extra thicknesses 67. Hydraulic lubrication lines 23" for bearings (for example the inter-shaft bearing) can follow this route along the sleeve and thus can contribute to the reduction of the diameter of the latter. Other lubrication lines could likewise be passed between the external tube 36 and the sleeve 26.

Figure 7:
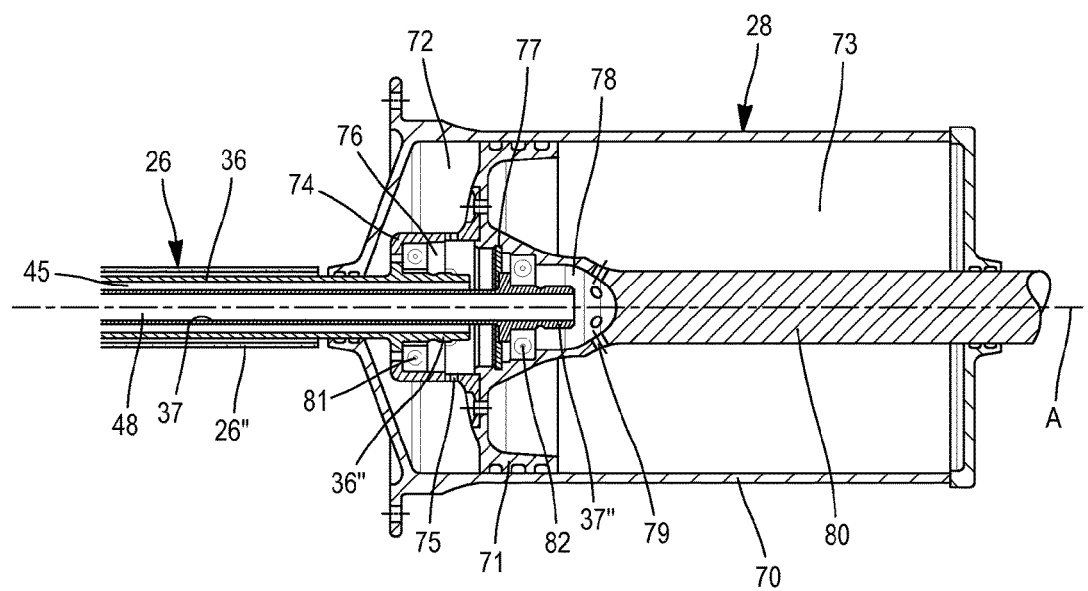
FIG. 7 shows, in longitudinal section, the linear actuator such as a jack, to which the tubes of the FFS system are connected, and of which the sliding results in the angular variation of the blades of the downstream propeller by means of an intermediate connection mechanism.

With regard to the jack 28 of the control assembly 25, illustrated in particular on FIGS. 3 and 7, the cylinder or external part 70 thereof is fixed in translation, along the axis A, and secured to a rotatable casing (not shown) of the turboshaft engine, in this case a rotatable casing of the downstream propeller. The piston 71 of the jack, movable in translation by the FFS system 27, separates the interior of the cylinder into two chambers, respectively an upstream chamber 72 and a downstream chamber 73, and is likewise rotatable, as will be seen below.

The annular passage 45 of the concentric tubes of the system 27 opens into the upstream chamber 72 of the jack. The external tube 36 is surrounded at its end 36" housed in the upstream chamber by an external cover 74 which is fixed to the piston by elements which are not shown. Holes 75 arranged in the cover enable communication between the annular passage 45 of the tubes opening into the interior of the cover 76 and the upstream chamber 72 of the jack.

The central passage 48 of the internal tube 37 opens into the downstream chamber 73 of the jack, beyond a partition 77 fluidically separating the annular passage 45 of the tubes from the axial central passage 48 of the internal tube. The latter therefore emerges from the external tube, passes axially through the partition 77 and opens by its end 37" into an internal cavity 78 of the piston 71. The central passage 48 of the internal tube 37 communicates with the downstream chamber 73 of the jack by holes 79 arranged in the piston between the cavity 78 and the downstream chamber 73.

Figure 1:
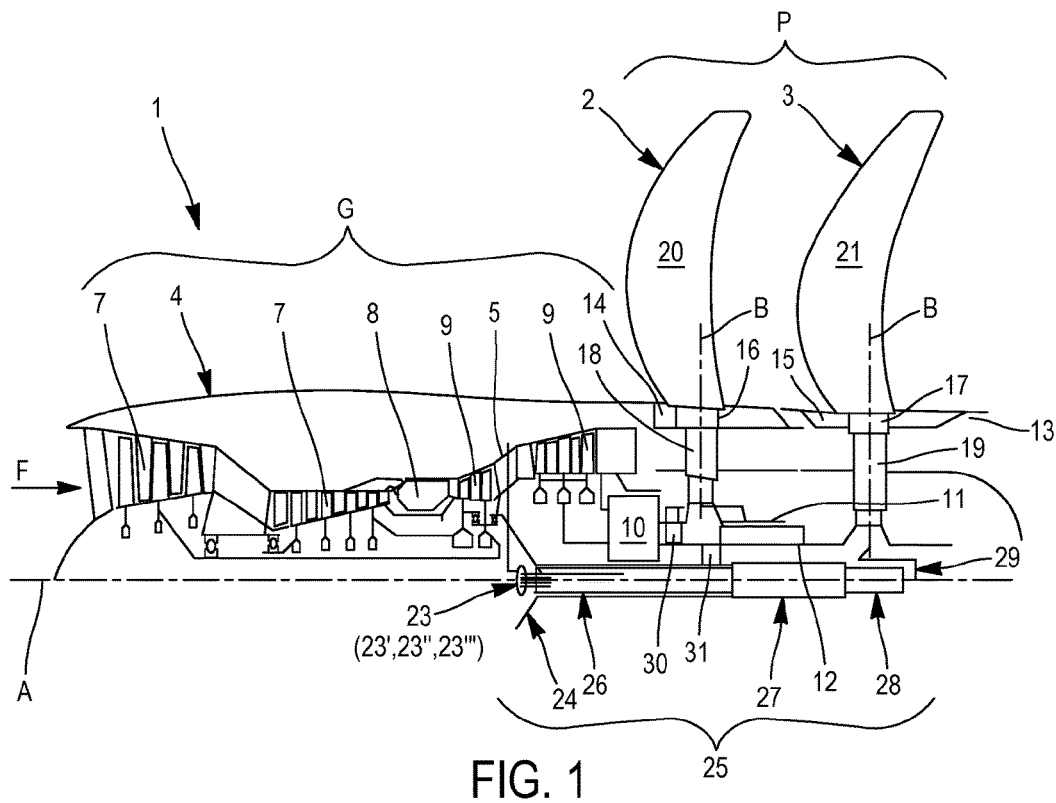
FIG. 1 shows a schematic view in longitudinal section of a turboshaft engine with a pair of respective upstream and downstream contra-rotating propellers, schematically incorporating a fluid control assembly for the variation of the pitch of the downstream propeller, according to the prior art.

The piston is extended, on the downstream chamber side, towards the outside of the cylinder, by the rod 80 secured to the piston to which the connecting rod mechanism 29 of the assembly 25 is connected. The connecting rods 29 of the assembly 25 are articulated on the pivots or shafts 19 of the blades 21 in order to modify their orientation around shafts B (FIG. 1) as a function of the position of the rod 80. The piston 71 and its rod 80 are thus rotatably connected to the casing with a ring 15 of the downstream propeller 3 by the connecting rod mechanism 29. Thus the linear jack 28 is rotatable.

Two bearings (roller bearings) are provided between the jack 28 and respectively the sliding tubes 36, 37 of the FFS system 27 in order to enable the rotation of the piston relative to the tubes and thus the change of reference point between the static reference point of the casing 24 and the rotatable reference point of the propeller. One bearing 81 is disposed between the external tube 36 and the cover 74 secured to the piston 71. The other bearing 82 is disposed in the cavity 78, between the internal tube 37 and the piston 71. Thus the rotation of the jack 28 (cylinder and piston) and the sliding of the piston 71 in relation to the cylinder 70 imposed by the oil under pressure circulating in the chambers of the body through the passages 45 and 48 of the tubes can be effected without problems. The functions of control of the axial course of the FFS system (tubes) are thus dissociated from the jack which ensures the actual transfer of motion. The separation of the functions between the jack and the system is obtained. The bearings ensure the changing of reference points. It will be recalled that in the prior arrangement the tubes of the system are rotatable and that only the part of the jack which is movable in translation is rotatable.

Without entering into a detailed description of the operation of the FFS system which does not form part of the invention in this case, it will be recalled that the desired orientation of the blades of the downstream propeller 3 is obtained in the following manner. The chambers 38, 39, 48 of the FFS system 27 are supplied with oil by the three respective lines 23', and the pressures transmitted in these lines and controlled upstream of the assembly 25 determine the different phases of operation of said assembly and, consequently, the required setting of the blades of the downstream propeller 3.

Thus, the oil supply to the upstream chamber 72 of the jack 28, from the left-hand chamber 38 of the body, the opening 44 and the annular passage 45, imposes upon the piston 71 its sliding course towards the right (outlet of the rod 80 of the jack) and, simultaneously, that of the tubes 36, 37, which corresponds to the phases of flight and of taxiing, with an orientation of the blades, via the connecting rod mechanism 29, from the feathered position to a quasi-reverse position.

The movement of the blades into the reverse position is obtained by the continuation of the movement of the tubes towards the right by producing a progressive communication of the two chambers 38, 39 of the FFS system through the oblong opening 44 greater than the partition 40. The surplus pressurised oil which reaches the chamber 72 results in the continuation of the sliding course of the piston 71 towards the right of the cylinder and full extension of the rod 80, corresponding to the reverse position of the blades.

The rapid return to the position of feathering of the blades is obtained by the supply of oil coming from the central passage or chamber 48 of the FFS system 27, of the downstream chamber 73 of the jack 28. The piston 71 is fully retracted (return course) towards the left of the cylinder (FIG. 7).

The control assembly 25 with its new architecture achieves the fixed objectives. Due to the arrangement of the FFS system 27 directly connected to the fixed casing 24 and the services 23 passing through the casing, the large hydraulic supply lines 23' are connected immediately to the body of the FFS system 27, and no longer pass through the interior of the sleeve (FIG. 2). The diameter of this sleeve can then be reduced significantly, since only the diameter of the external tube has to pass through it, a diameter which is substantially less than the sum of the three diameters of the large hydraulic lines initially arranged side by side.

Moreover, the sleeve 26 thus reduced frees the space around it, in particular in order to enable the arrangement, along the sleeve, of electrical harnesses intended for equipment and other lines for lubrication of the bearings, and these (hydraulic and electrical) lines are then accessible and visible and thus can be connected, no longer blindly, but in an easy and reliable manner from the exterior. Above all, this gain of space by the limitation of the radial dimension of the sleeve makes it possible to define an epicyclic reduction gear 10 having a greater reduction ratio, since the planetary shaft 10' of this reduction gear can have a smaller diameter, which increases the reduction ratio of the reduction gear.

The invention claimed is:

1. Turbine engine having an epicyclic reduction gear driven by a planetary shaft connected to a power turbine of said turbine engine, having a fluid control assembly for varying the pitch of a downstream propeller of the turbine engine, said assembly connecting an upstream static casing of the turbine engine, into which fluid and electrical supply lines arrive, to the blades of the downstream propeller, and said upstream static casing is connected to the blades of the downstream propeller by, from upstream to downstream:

a system for controlling fluid pitch, comprising:

a hollow body secured to the static casing and in which are received two sliding concentric tubes housed in the planetary shaft of the epicyclic reduction gear and delimiting two fluid passages, including internal chambers delimited by the hollow body and the two sliding concentric tubes being connected respectively to the supply lines, a linear actuator having a cylinder separated in two chambers by a piston and extended by a rod outside the cylinder which is connected to the blades by a mechanism with connecting rods, said two sliding concentric tubes being secured to the piston and their two fluid passages being respectively connected to the two chambers of the linear actuator, wherein the system for controlling fluid pitch controls the sliding of the piston and the rod allowing the blades of the downstream propeller to rotate.

2. Turbine engine according to claim 1, characterised in that the system for controlling fluid pitch is arranged inside the upstream static casing, in that the two sliding concentric tubes are respectively external and internal sliding concentric tubes, and in that internal chambers delimited by the hollow body and the external and internal sliding concentric tubes and connected respectively to the supply lines in order to control, by the sliding of the tubes and of the piston of the actuator, the orientation of the blades of the propeller, according to the operational phases of the turbine engine.

3. Turbine engine according to claim 2, characterised in that the internal chambers of the hollow body comprises two internal adjacent chambers which are separated by a partition and through which the external tube passes, the two chambers being capable of communicating, via an opening having a length greater than the length of the partition and arranged on the external tube, with one of the two fluid passages being annular and provided between the two external and internal sliding concentric tubes and opening into one of the two chambers of the actuator, on one side of the piston, and a third internal chamber connected to the other of the fluid passages of the internal tube and opening into the other of the two chambers of the actuator, on the other side of the piston.

4. Turbine engine according to claim 3, characterised in that the two external and internal sliding tubes are guided and retained together by an annular sleeve, at one of their ends, whilst their other ends are connected to the piston of the actuator.

5. Turbine engine according to claim 1, characterised in that the assembly has a sleeve fixed downstream of the hollow body of the fluid control system, the sleeve being supported over its length by at least one bearing, a downstream end of the sleeve being situated upstream and in the vicinity of the actuator, and the sleeve being accommodated in the planetary shaft of the epicyclic reduction gear.

6. Turbine engine according claim 5, characterised in that the sleeve has, on an outer periphery, local areas of extra radial thickness for the support of a bearing, between which hydraulic and/or electrical supply lines can pass along the sleeve in a direction of bearings and/or equipment.

7. Turbine engine according to claim 1, characterised in that the actuator is rotatable, a cylinder fixed in translation being secured to a rotatable casing of the propeller, and the sliding piston to which the tubes of the system for controlling fluid pitch are connected, is connected to the mechanism with connecting rods, said rods being articulated on the pivots of the blades to be oriented, and being mounted on a casing with a ring of the propeller.

8. Turbine engine according to claim 1, characterised in that, in order to enable the change of reference point between the sliding tubes of the system for controlling fluid pitch and the linear actuator, bearings are provided between the external tube and the piston, and between the internal tube and the piston.

9. Turbine engine according to claim 1, in which the static casing has an external casing and in said external casing an aerodynamic casing for the passage of the gaseous flow, and having radial branches for the passage of the supply lines in the direction of the system for controlling fluid pitch, a collector being provided between the aerodynamic casing and the control system in order to combine the supply lines on a cylindrical support and to define with the latter and with upstream and downstream transverse partitions a ventilation chamber with the gaseous flow and, below the support, a recovery chamber for lubricant coming from the system for controlling fluid pitch.

10. Turbine engine according to claim 1 for an aircraft, of the type comprising a gas generator part and a propulsion part with a pair of upstream and downstream coaxial and contra-rotating propellers for controlling the pitch variation of the upstream and downstream propellers as a function of the operating phases of the turbine engine.

* * * * *